(12) United States Patent
Yasuda et al.

(10) Patent No.: US 6,330,365 B1
(45) Date of Patent: *Dec. 11, 2001

(54) DECODING METHOD AND APPARATUS USING BITSTREAMS AND A HIERARCHICAL STRUCTURE

(75) Inventors: Makoto Yasuda, Nagaokakyoshi; Akihiro Watabe, Udagun, both of (JP)

(73) Assignee: Matsushita Electric Industrial Co., Ltd. (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/962,043

(22) Filed: Oct. 31, 1997

(30) Foreign Application Priority Data

Oct. 31, 1996 (JP) .................................................... 8-289520

(51) Int. Cl.[7] .............................. G06K 9/36; G06K 9/46
(52) U.S. Cl. ................. 382/233; 348/425.2; 375/240.27
(58) Field of Search ..................................... 382/233, 236, 382/239, 245, 246, 248, 250; 358/432, 433, 539, 427, 431; 348/403, 407, 409, 420, 432, 466, 845, 845.1; 386/2, 6–8, 21, 27, 33, 37, 40, 47, 68, 109, 111, 123, 124; 341/94, 106; 371/2.1, 37.7, 37.8, 47.1, 48

(56) References Cited

U.S. PATENT DOCUMENTS

| | | | |
|---|---|---|---|
| 4,972,417 | * | 11/1990 | Sako et al. ............................... 386/47 |
| 5,376,969 | * | 12/1994 | Zdepski ................................. 348/466 |
| 5,502,493 | * | 3/1996 | Meyer ................................... 348/845 |

FOREIGN PATENT DOCUMENTS

| | | | |
|---|---|---|---|
| 58-54729 | 3/1983 | (JP) | ............................... H03K/13/22 |
| 5-160747 | 6/1993 | (JP) | ............................... H03M/7/30 |

\* cited by examiner

*Primary Examiner*—Timothy M. Johnson
(74) *Attorney, Agent, or Firm*—Parkhurst & Wendell, L.L.P.

(57) ABSTRACT

A decoding method includes using a plurality of first bitstreams that are obtained by dividing a main bitstream with a hierarchical structure as inputs, successively arranging the plurality of first bitstreams and arranging selected second bitstreams before first hierarchical information of specified bitstreams among bitstreams constituting a specified hierarchy in the main bistream. Each second bitstream includes at least one of a plurality of codes including portions of the second bitstreams that do not corresond to specified code tables that are used for decoding bistreams, thereby forming a third bitstream.

11 Claims, 11 Drawing Sheets

Prior Art

Prior Art

| code | symbol |
|------|--------|
| 0001 | A |
| 0010 | B |
| 0011 | C |
| 0101 | D |
| 0110 | E |
| 0111 | P |

Fig.11 (a)

| code | symbol : (run, level) |
|---|---|
| 10 | EOB (End Of Block) |
| 011 s | (1, 1) |
| 0100 s | (0, 2) |
| 0101 s | (2, 1) |
| 0010 1 s | (0, 3) |
| 0011 1 s | (3, 1) |
| 0011 0 s | (4, 1) |
| ⋮ | ⋮ |
| 0000 100 s | (2, 2) |
| ⋮ | ⋮ |
| 0000 0000 0001 1100 s | (30, 1) |
| 0000 0000 0001 1011 s | (31, 1) |
| 0000 01 | escape | s : sign of level

Fig.11 (b)

| code | symbol : (run) |
|---|---|
| 0000 00 | 0 |
| 0000 01 | 1 |
| 0000 10 | 2 |
| ⋮ | ⋮ |
| 1111 11 | 63 |

Fig.11 (c)

| code | symbol : (level) |
|---|---|
| 1000 0000 0001 | −2047 |
| 1000 0000 0010 | −2046 |
| ⋮ | ⋮ |
| 1111 1111 1111 | −1 |
| 0000 0000 0001 | +1 |
| ⋮ | ⋮ |
| 0111 1111 1111 | +2047 |

DECODING METHOD AND APPARATUS USING BITSTREAMS AND A HIERARCHICAL STRUCTURE

FIELD OF THE INVENTION

The present invention relates to a decoding method and a decoding apparatus that are employed when Information is transmitted through a transmission line and is stored in a storage device.

BACKGROUND OF THE INVENTION

In recent years, with the advance of an information-oriented society, transmission of moving pictures without the barriers of time and distance has been increasingly demanded. The time has come when digital techniques are made practicable in earnest, and it is possible to record and reproduce moving pictures in a recording device and to transmit the moving pictures over a long distance via a communication network In addition, not only in a communication field but in a broadcasting field, transmission using digital techniques and adoption of a coding system have been realized.

Generally, moving pictures and audio signals of digital signals are large in amount of coding. Therefore, in order to record and transmit these moving pictures and audio signals with good efficiency, it Is necessary to utilize high-efficiency coding techniques, and various coding apparatus and decoding apparatus have been already manufactured by way of trial.

As examples of application, there are a video CD (compact disk) in which digital moving pictures are recorded in a CD, and a DVD which records digital moving pictures at higher image quality and for a longer time than those of the video CD.

For a decoding apparatus that reproduces these video CD and DVD, trick play, such as fast forward play and fast reverse play, is indispensable. In order to realize the trick play, there is a method corresponding to one that is described in the international standard, called MPEG (moving picture experts group), "Information Technology—Coding of moving pictures and associated audio for digital storage media at up to about 1.5 Mbits/s" (ISO/IEC11172-2). A description will be given of a conventional method for decoding digital moving pictures using the above-described method.

First, a method for coding digital moving pictures and a bitstream in the MPEG are described.

Figure 5:
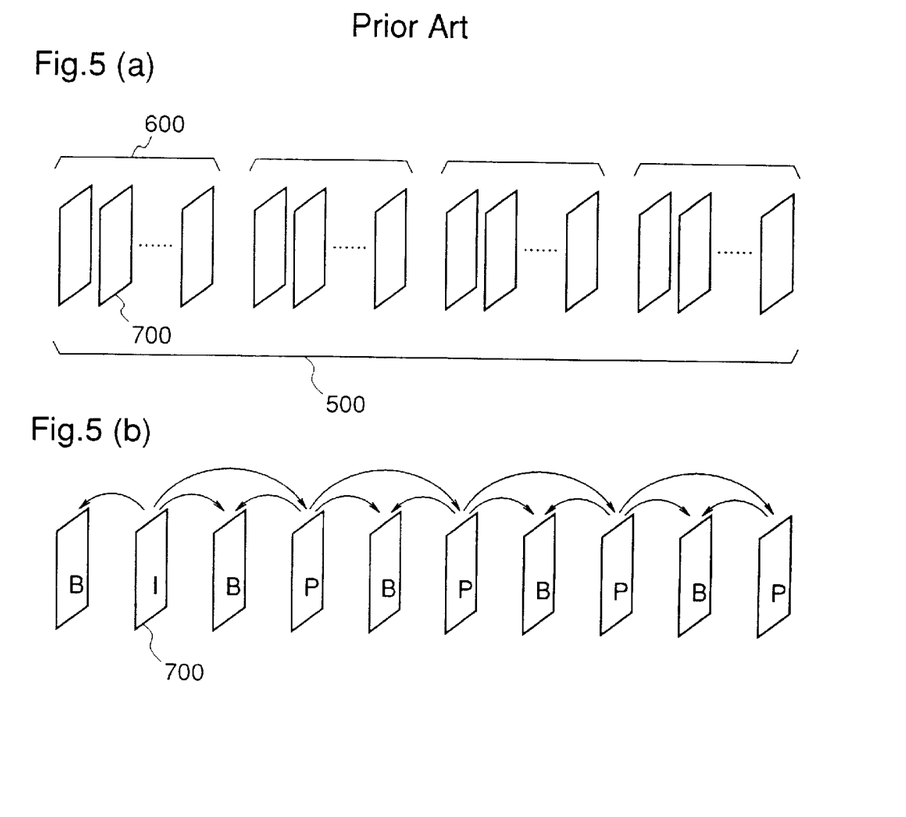
FIGS. 5(a) and 5(b) are diagrams for explaining a conventional coding method.

In the MPEG, assuming that digital moving pictures comprise a series of video frames 700 as shown in FIG. 5(*a*), a video frame group 500, which is called a sequence, is coded. This sequence is usually divided into a series of video frame groups 600 at about 0.5 second each, which are called GOP (group of pictures), to be coded The GOP comprises I picture, P pictures and B pictures, for example, as schematically shown in FIG. 5(*b*). The I picture is an Intra-Picture that is coded with only data in the video frame, the P picture is a Predictive Picture that is predicted and coded from data of the I picture or P picture of two frames before, and the B picture is a Bidirectionally Predictive-Picture that is predicted and coded from data of the I and P pictures or the P pictures before and after the B picture.

Figure 6:
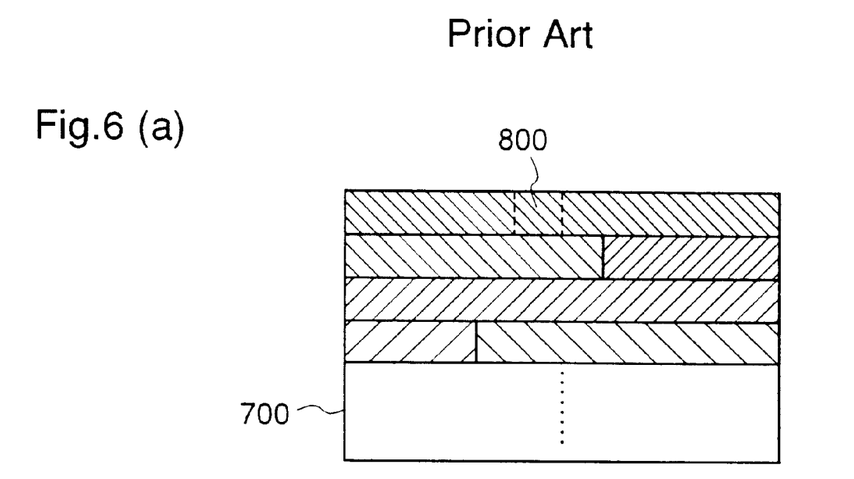
FIGS. 6(a) and 6(c) are diagrams for explaining the conventional coding method.

FIG. 6(*a*) shows a structure of each picture. The picture comprises a continuous region or more having a belt shape on a picture plane, which is called a slice. The slice comprises a block 800 or more of 16 lines long and 16 pixels broad, which is called a macroblock.

As shown in FIGS. 6(*b*) and 6(*c*), the macroblock comprises a plurality of blocks of 8 lines long and 8 pixels broad, which are called blocks. For example, the macroblock comprises blocks of four luminance signals and respective chrominance signals of two systems (Cb, Cr).

Figure 7:
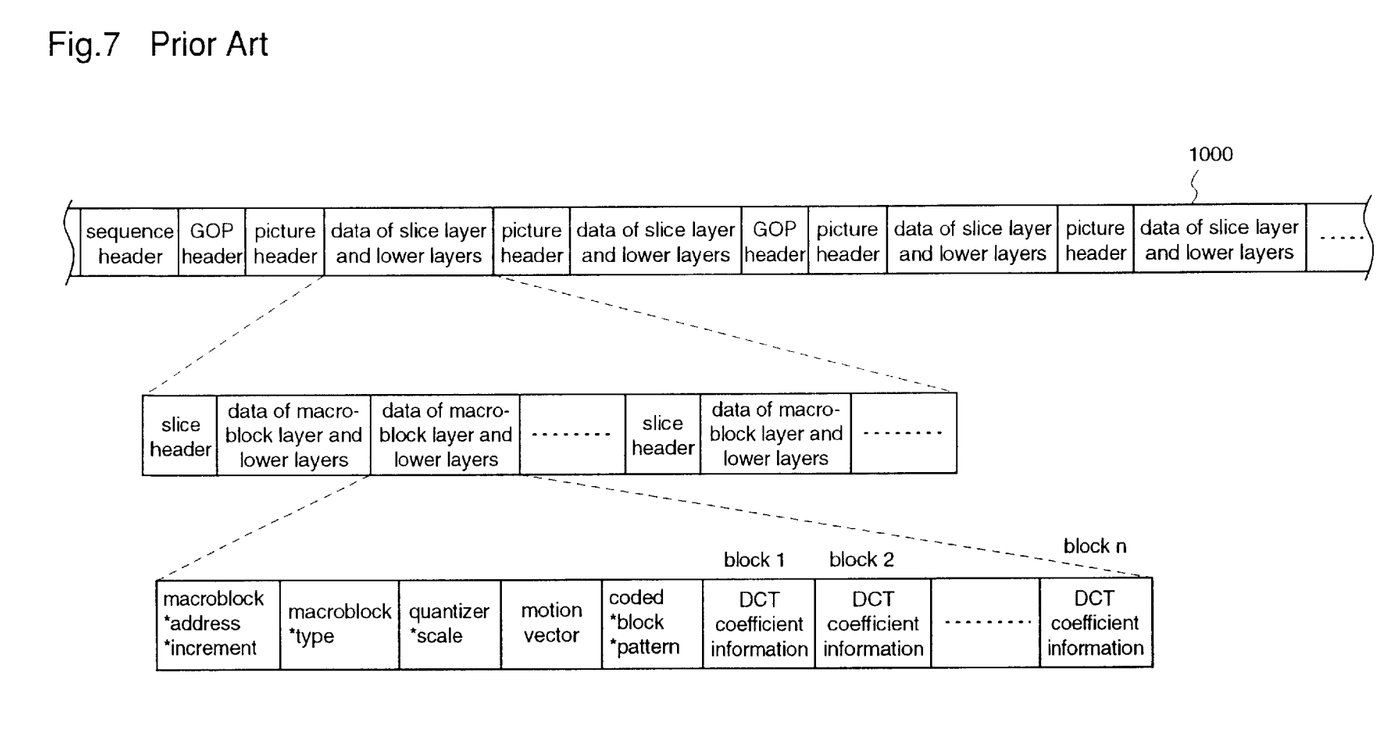
FIG. 7 is a diagram for explaining the conventional coding method.

As described above, the bitstream has a hierarchical structure. The sequence, the GOP, the picture and the slice, i.e., bitstreams constituting higher hierarchies of the hierarchical structure, include start codes for uniquely identifying these bitstreams on the bitstream, respectively. Further, the bitstreams have regions that retain hiearchical information, called headers and extensions, having coded information of the bitstreams constituting the respective hierarchies. For example, as shown in FIG. 7, these data are arranged to constitute a bitstream 1000.

In the hierarchy of the macroblocks and the lower hierarchy, there is information, such as a macroblock address increment that shows how many macroblocks each macroblock is away from the macroblock which was coded last time by, a macroblock type that represents predictive mode information of the macroblock, which was selected at coding, a quantizer scale that represents a quantization step, a motion vector that is used for motion compensation, a coded block pattern that shows which blocks are coded and are present in the bitstream, and coded DCT (discrete cosine transform) coefficient information.

At this time, variable length codes are used in coding the information of the hierarchy constituted by the macroblocks and the lower hierarchy. By allocating a shorter code to the information appearing more frequently, the information of the hierarchy constituted by the macroblocks and the lower hierarchy, which occupies the large portion of the bitstream, is coded efficiently.

Figure 8:
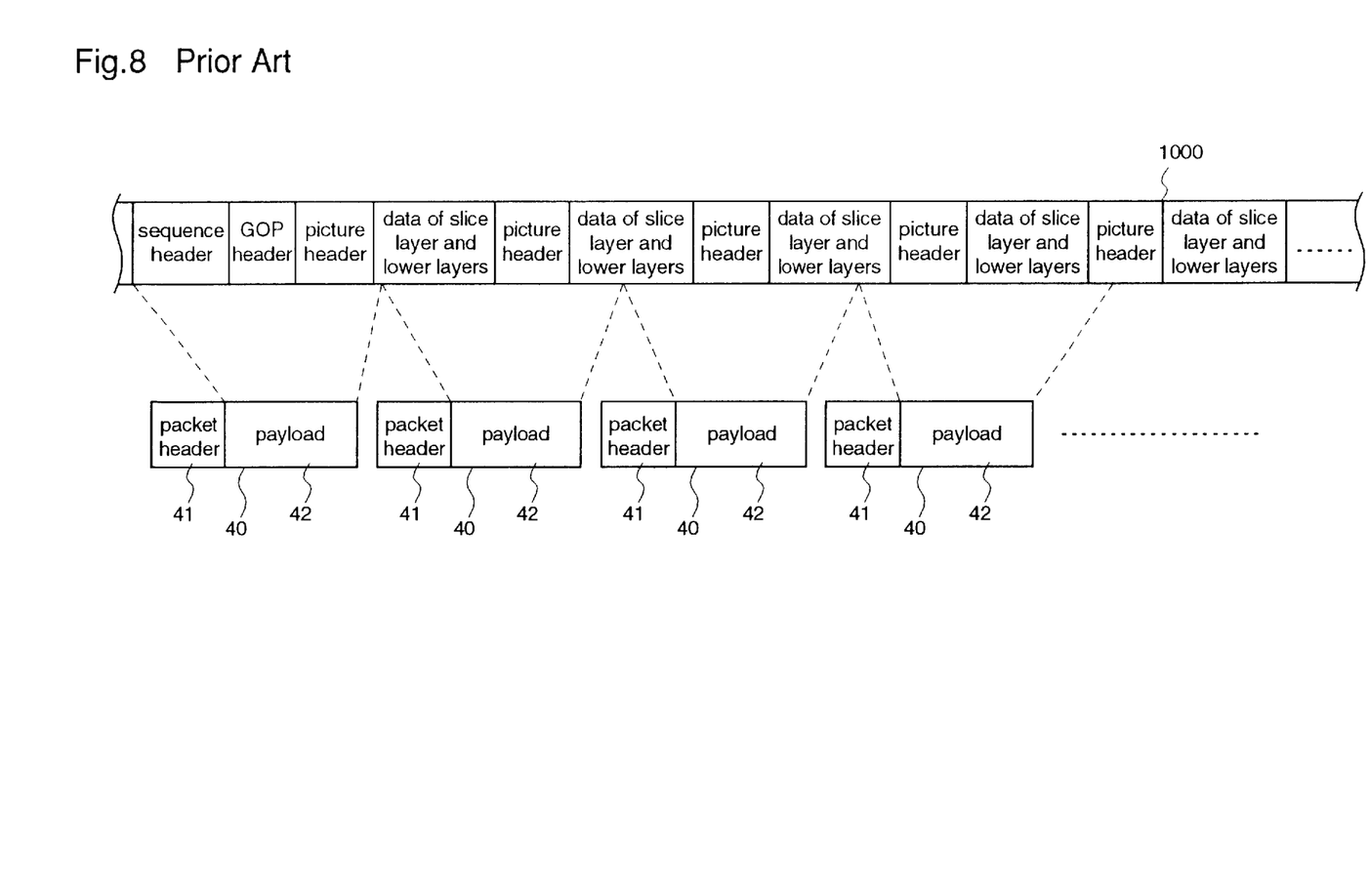
FIG. 8 is a diagram for explaining the conventional coding method.

In reality, as shown in FIG. 8, the bitstream is divided into packets 40 of appropriate lengths. Similarly, audio signals that are coded separately from the moving pictures are divided into packets. In addition, a packet header 41 that retains identification information is added to the head of each packet 40, for identifying the information of the packet These packets are multiplexed to form the bitstream 1000. The information in each packet 40 that has been originally included in the bitstream 1000 is called a payload region 42.

A description is given of a fast forward play method and a fast reverse play method of the bitstream.

In a case of normal play, the bitstream is all reproduced and all the pictures are decoded to be displayed. In a case of fast forward play, however, all the bitstream is transmitted to a decoding apparatus, and the I pictures are selected from the bitstream and decoded in the decoding apparatus to be displayed. Alternatively, only the I pictures are selectively transmitted to the decoding apparatus, and these pictures are decoded in the decoding apparatus to be displayed.

In the decoding apparatus, using a code table that shows relationships between codes and symbols, such as picture data, corresponding to the codes, decoding is performed while collating bitstreams that are successively input with the code table. When the decoding apparatus finds a symbol that is not defined in the code table, decoding of a picture with the symbol is stopped immediately, and the picture is subjected to error concealment processing as error processing.

As an example of error concealment processing, concerning a picture that has not been decoded by stopping, a content of the previous picture that has been decoded is copied to a portion of the picture that is not accomplished, thereby accomplishing a video frame, and the video frame is displayed in place of the picture that has not been decoded by stopping. Then, processing of skipping to a header of a next picture is performed.

As another example of error concealment processing, a picture that has not been decoded by stopping is not displayed at all, and processing of skipping to a header of a next picture is only performed.

There are a case in which one of these error concealment processings is always performed, and a case in which the processing is adaptably switched. Similarly, when the presence of the header and extension does not satisfy a specified syntactic rule, an error is considered to occur, and the same processing as described above is performed.

Figure 9:
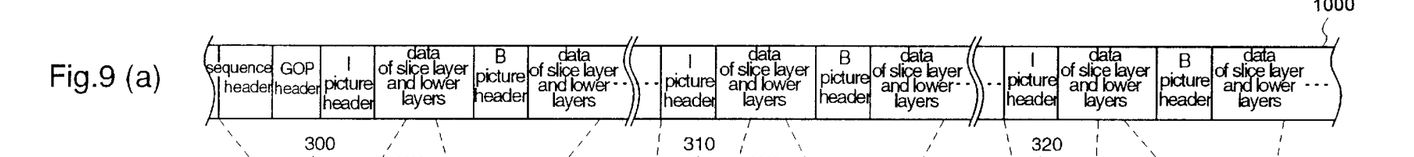
FIGS. 9(a) to 9(d) are diagrams for explaining a conventional coding method at fast forward play and fast reverse play.

However, when practically using the above-described method for fast forward play, the capability to parse the bitstream is insufficient, and the selection of the I pictures is complicated. Therefore, without transmitting all bitstream fragments including all the bitstream 1000 to the decoding apparatus as shown in FIG. 9(*a*), only bitstream fragments 300, 310, 320, . . . comprising the packets 40, each fragment being considered to include a specified bitstream, such as the I picture, are selectively transmitted to the decoding apparatus (FIG. 9(*b*)), the payload regions 41 of the packets constituting these bitstream fragments are arranged again to form an elementary bitstream 1001 (FIG. 9(*c*)), thereby successively reproducing only the I pictures along a time series. This reproduction is perfromed by decoding the bitstreams to data for reproduction while successively collating the codes constituting the elementary bitstream 1001 with a code table. The code table previously defines relationships between the codes used for coding and the data for reproduction. In addition to the I pictures, the P pictures of the elementary bitstream 1001 may be reproduced.

Fast reverse play is realized by transmitting the bitstream fragments at intervals in reverse of the fast forward play, i.e., while going back the time. That is, the bitstream fragments are transmitted to the decoding apparatus in the order of 320, 310, 300, . . . .

At this time, the packets including the heads of the I pictures in the GOP are often Identified by using management information that is separately recorded on a disk or the like. Further, the bitstream is often divided into packets so that the heads of the I pictures are the heads of the packets.

In the construction described above, in performing fast forward play and fast reverse play, the bitstream fragments comprising the packets at intervals are transmitted to the decoding apparatus. Therefore, as shown in FIG. 9(*d*) that is obtained by enlarging a portion 80 shown in FIG. 9(*c*), when the bitstream fragment does not include the bitstream of the picture to the end, in a region before and after the connection point A with the following bitstream fragment, the code is different from a code to be decoded. Usually, the connection point A is detected as an error during decoding to stop decoding the picture that has been decoded till this time, and error processing is performed to the picture. Then, decoding of the following picture is resumed. However, there is a case where the code in the region before and after the connection point A is syntactically correct, i.e., the code can be decoded according to a code table. In this case, no error is detected at the connection point A and it is considered that the code in the region before and after the connection point A is normal, so that decoding of the code is performed. Sequentially, the codes of the following pictures may be decoded as codes different from the original codes. Accordingly, without normally decoding the following pictures, pictures different from the original pictures may be decoded, resulting in excessive disturbance of the pictures.

Further, in this case, error detection is not always performed at the region before and after the connection point A, and the elementary bitstream is parsed and decoded as far as the part at which a syntactic error clearly occurs. Therefore, the decoding apparatus takes wasteful time, so that time required for the following normal decoding operation cannot be reserved.

SUMMARY OF THE INVENTION

It is an object of the present invention to provide a decoding method and a decoding apparatus in which a normal decoding operation can be performed at trick play, such as fast forward play and fast reverse play.

Other objects and advantages of the present invention will become apparent from the detailed description given hereinafter; it should be understood, however, that the detailed description and specific embodiment are given by way of illustration only, since various changes and modifications within the scope of the invention will become apparent to those skilled in the art from this detailed description.

According to a first aspect of the present invention, a decoding method includes using a plurality of first bitstreams that are obtained by dividing a main bitstream with a hierarchical structure as inputs, successively arranging the plurality of first bitstreams and arranging specified second bitstreams before first hierarchical information of specified bitstreams among bitstreams constituting a specified hierarchy in the main bitstream, each second bitstream being such that at least one of codes including portions of the second bitstream does not correspond to specified code tables that are used for decoding bitstreams, thereby forming a third bitstream. Therefore, second bitstreams, each being such that at least one of codes including portions of the second bitstream does not correspond to specified code tables that are used for decoding bitstreams, are inserted immediately before first hierarchical information of specified bitstreams among bitstreams constituting a specified hierarchy in a main bitstream, of first bitstreams that are obtained by dividing the main bitstream with a hierarchical structure. Thereby, error codes are produced immediately before the first hierarchical information, and decoding is reliably resumed at each specified bitstream. Consequently, even when first bitstreams at intervals are input at fast forward play and fast reverse play, and codes at the vicinity of connection parts between the first bitstreams are recognized as codes different from the original codes to be decoded, data different from the original specified bitstreams are not decoded, thereby obtaining a decoding method and a decoding apparatus in which normal decoding operation is possible at trick play, such as fast forward play and fast reverse play. Further, error detection is securely performed immediately before the first hierarchical information, and the third bitstream is not parsed as far as a part after the connection part between the first bitstreams, at which part a syntactic error clearly occurs. Therefore, the decoding means does not take wasteful time, and time required for the following normal decoding operation can be reserved.

According to a second aspect of the present invention, the decoding method of the first aspect of the invention includes, after forming the third bitstream, decoding the third bitstream using the specified code tables, while recognizing the code including a portion of the second bitstream that does not correspond to the specified code tables as an error code. Consequently, even when first bitstreams at intervals are input at fast forward play and fast reverse play, and codes at the vicinity of connection parts between the first bitstreams are recognized as codes different from the original codes to be decoded, data different from the original specified bitstreams are not decoded, thereby obtaining a decoding method and a decoding apparatus in which normal decoding operation is possible at trick play, such as fast forward play and fast reverse play. Further, error detection is securely performed immediately before the first hierarchical information, and the third bitstream is not parsed as far as a part after the connection part between the first bitstreams, at which part a syntactic error clearly occurs. Therefore, the decoding means does not take wasteful time, and time required for the following normal decoding operation can be reserved.

According to a third aspect of the present invention, the decoding method of the first aspect of the invention includes stopping the decoding processing when the code including a portion of the second bitstream is recognized as an error code, and resuming decoding processing from the first hierarchical information after the second bitstream having the portion in the code recognized as an error code. Consequently, even when first bitstreams at intervals are input at fast forward play and fast reverse play, and codes at the vicinity of connection parts between the first bitstreams are recognized as codes different from the original codes to be decoded, data different from the original specified bitstreams are not decoded, thereby obtaining a decoding method and a decoding apparatus in which normal decoding operation is possible at trick play, such as fast forward play and fast reverse play. Further, error detection is securely performed immediately before the first hierarchical information, and the third bitstream is not parsed as far as a part after the connection part between the first bitstreams, at which part a syntactic error clearly occurs. Therefore, the decoding means does not take wasteful time, and time required for the following normal decoding operation can be reserved.

According to a fourth aspect of the present invention, the decoding method of the first aspect of the invention includes performing specified error processing to the bitstream that has been decoded immediately before the code recognized as an error code. Consequently, even when first bitstreams at intervals are input at fast forward play and fast reverse play, and codes at the vicinity of connection parts between the first bitstreams are recognized as codes different from the original codes to be decoded, data different from the original specified bitstreams are not decoded, thereby obtaining a decoding method and a decoding apparatus in which normal decoding operation is possible at trick play, such as fast forward play and fast reverse play. Further, error detection is securely performed immediately before the first hierarchical information, and the third bitstream is not parsed as far as a part after the connection part between the first bitstreams, at which part a syntactic error clearly occurs. Therefore, the decoding means does not take wasteful time, and time required for the following normal decoding operation can be reserved.

According to a fifth aspect of the present invention, the decoding method of the first aspect of the invention includes the specified bitstream being specified picture information; the first hierarchical information being header information; and the plurality of first bitstreams being bitstreams including the specified picture information among bitstreams that are obtained by dividing the main bitstream including the plurality of specified picture information that are arranged along a time series. The specified bitstream is specified picture information, the first hierarchical information is header information, and the plurality of first bitstreams are bitstreams including the specified picture information among payload regions of packets that are obtained by dividing the main bitstream including the plurality of specified picture information that are arranged along a time series. Therefore, even when codes at the vicinity of connection parts between the payloads are recognized as codes different from the original codes to be decoded, pictures different from the original specified pictures are not decoded, excessive disturbance of the pictures can be prevented from occurring.

According to a sixth aspect of the present invention, the decoding method of the first aspect of the invention includes the specified picture information being one of I picture information, I and P picture Information, and I, P and B picture information, therefore, even when codes at the vicinity of connection parts between the payloads are recognized as codes different from the original codes to be decoded, pictures different from the original specified pictures are not decoded, excessive disturbance of the pictures can be prevented from occurring.

According to a seventh aspect of the present invention, the decoding method of the first aspect of the invention includes the second bitstream being inserted between the first hierarchical information and the information immediately before the first hierarchical information. Consequently, even when first bitstreams at intervals are input at fast forward play and fast reverse play, and codes at the vicinity of connection parts between the first bitstreams are recognized as codes different from the original codes to be decoded, data different from the original specified bitstreams are not decoded, thereby obtaining a decoding method and a decoding apparatus in which normal decoding operation is possible at trick play, such as fast forward play and fast reverse play. Further, error detection is securely performed immediately before the first hierarchical information, and the third bitstream is not parsed as far as a part after the connection part between the first bitstreams, at which part a syntactic error clearly occurs. Therefore, the decoding means does not take wasteful time, and time required for the following normal decoding operation can be reserved.

According to an eighth aspect of the present invention, the decoding method of the first aspect of the invention includes the second bitstream being replaced the bitstream immediately before the first hierarchical information with. Since the second bitstream is replaced the bitstream immediately before the first hierarchical information with, the bit number of the third bitstream is not increased by the second bitstream, thereby reducing a burden on data transmission, as compared with the case where the second bitstream is inserted between the first hierarchical information and the information immediately before the first hierarchical information According to a ninth aspect of the present invention, the decoding method of the first aspect of the invention includes the second bitstream comprising consecutive "0" data of 23 bits and over. Consequently, even when first bitstreams at intervals are input at fast forward play and fast reverse play, and codes at the vicinity of connection parts between the first bitstreams are recognized as codes different from the original codes to be decoded, data different from the original specified bitstreams are not decoded, thereby obtaining a decoding method and a decoding apparatus in which normal decoding operation is possible at trick play, such as fast forward play and fast reverse play. Further, error detection is securely performed immediately before the first hierarchical information, and the third bitstream is not parsed as far as a part after the connection part between the first bitstreams, at which part a syntactic error clearly occurs. Therefore, the decoding means does not take wasteful time, and time required for the following normal decoding operation can be reserved.

According to a tenth aspect of the present invention, a decoding apparatus using a plurality of bitstreams respectively including first bitstreams that are obtained by dividing a main bitstream with a hierarchical structure as inputs, comprises extract means for extracting the first bitstreams from the plurality of bitstreams and outputting the same; detection means for detecting start positions of hierarchical information of specified bitstreams from bitstreams constituting a specified hierarchy that are included in the output of the extract means; second bitstream generating means for generating second bitstreams, each being such that at least one of codes including portions of the second bitstream does not correspond to a plurality of specified code tables that are used for decoding bitstreams; selection means for selecting and outputting the output of the extract means and the output of the second bitstream generating means; and control means for controlling the selection means so that the second bitstreams are arranged immediately before the start positions of the hierarchical information that are detected in the detection means. Consequently, even when first bitstreams at intervals are input at fast forward play and fast reverse play, and codes at the vicinity of connection parts between the first bitstreams are recognized as codes different from the original codes to be decoded, data different from the original specified bitstreams are not decoded, thereby obtaining a decoding method and a decoding apparatus in which normal decoding operation is possible at trick play, such as fast forward play and fast reverse play. Further, error detection is securely performed immediately before the first hierarchical information, and the third bitstream is not parsed as far as a part after the connection part between the first bitstreams, at which part a syntactic error clearly occurs. Therefore, the decoding means does not take wasteful time, and time required for the following normal decoding operation can be reserved.

According to an eleven aspect of the present invention, in the decoding apparatus of the tenth aspect of the invention, the second bitstream comprises consecutive "0" data of 23 bits and over. Consequently, even when first bitstreams at intervals are input at fast forward play and fast reverse play, and codes at the vicinity of connection parts between the first bitstreams are recognized as codes different from the original codes to be decoded, data different from the original specified bitstreams are not decoded, thereby obtaining a decoding method and a decoding apparatus in which normal decoding operation is possible at trick play, such as fast forward play and fast reverse play. Further, error detection is securely performed immediately before the first hierarchical information, and the third bitstream is not parsed as far as a part after the connection part between the first bitstreams, at which part a syntactic error clearly occurs. Therefore, the decoding means does not take wasteful time, and time required for the following normal decoding operation can be reserved.

DETAILED DESCRIPTION OF THE PREFERRED EMBODIMENT

Figure 1:
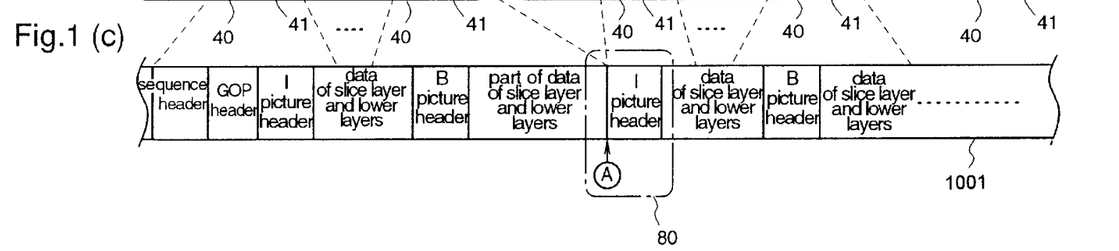
FIGS. 1(a) to 1(c) are diagrams for explaining a decoding method according to an embodiment of the present invention.

FIGS. 1(a) to 1(c) are diagrams for explaining a decoding method according to an embodiment of the present invention. A description is given of the operation of the decoding method.

In fast forward play, all the bitstream fragments including all the bitstream 1000 as a main bitstream is not transmitted to a decoding apparatus. As shown in figure 1(a), the bitstream fragments 300, 310, 320, . . . at intervals, each fragment being considered to include a specified picture, in this case, I picture, are successively transmitted to the decoding apparatus, and the I pictures included in the bitstream fragments at intervals are successively reproduced.

Similarly, fast reverse play is realized by transmitting the bitstream fragments at intervals while going back the time, and successively reproducing the I pictures in the bitstream fragments. That is, the bitstream fragments are transmitted to the decoding apparatus in the order of 320, 310, 300, . . . .

Each bitstream fragment that is input to the decoding apparatus comprises one or a plurality of packets 40, each including all the I picture or a portion of the I picture These packets 40 comprise payload regions 41 including first bitstreams that are obtained by dividing the bitstream 1000 as a main bitstream, and packet headers that are added to the respective payload regions 41. As shown in FIG. 1(b), only the bitstreams that are stored in the payload regions 41 are extracted as first bitstreams, and these data are successively arranged along a time series, or while going back the time series, thereby obtaining a bitstream of digital moving pictures that are used for fast forward play or fast reverse play, i.e., the elementary bitstream 1001 as a third bitstream as shown in FIG. 1(c).

Figure 2:
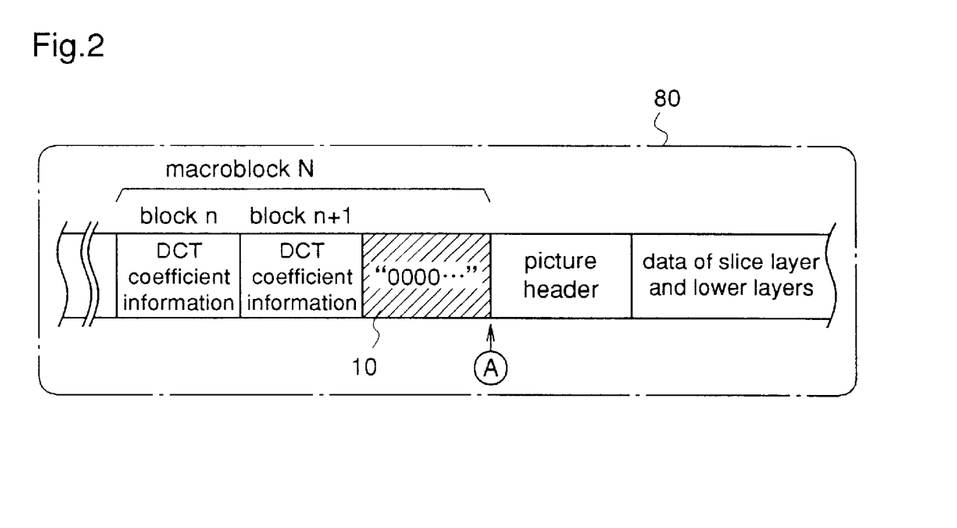
FIG. 2 is a diagram for explaining a principal step in the decoding method according to the embodiment of the invention.

FIG. 2 is a diagram illustrating a principal step in the decoding method according to the embodiment of the invention. When the bitstreams that are stored in the payload regions 41 are arranged, as shown in FIG. 2, each bitstream fragment is parsed and dummy data 10 as a second bitstream is inserted immediately before the header of the specified picture, i.e., I picture among bitstreams constituting a specified hierarchy in the bitstream 1000. The dummy data 10 is, for example, a code comprising a plurality of consecutive "0" data. By adding this dummy data 10, a plurality of "0" data are arranged between the header of the I picture and the elementary bitstream immediately before.

Figure 10:
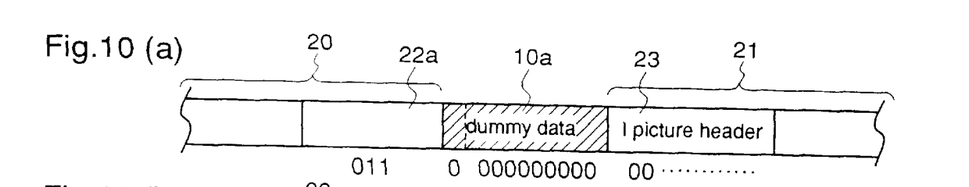
FIGS. 10(a) to 10(f) are diagrams for explaining the principle of the decoding method according to the embodiment of the invention.

The dummy data 10 is described. FIGS. 10(a) to 10(f) are diagrams for explaining the principle of the decoding method according to the embodiment of the invention. FIGS. 10(a) to 10(e) show various connection patterns between the bitstream fragments, and FIG. 10(f) shows a code table. In this case, six kinds of codes correspond to six symbols. In these figures, reference numerals 22a to 22d designate codes at the end of a bitstream fragment 20, numeral 23 designates a header of I picture of a bitstream fragment 21 that is arranged after the bitstream fragment 20 and, for example, a start code comprising a plurality of "0" data is added to the head of the picture header 23. In this case, at least two bits at the head of the picture header 23 are "0". In FIGS. 10(a) to 10(d), dummy data 10a comprising "0" data of 10 bits is arranged immediately before the picture header 23. Although the dummy data 10a comprising "0" data of 10 bits is used as an example for explanation of the principle, dummy data comprising a different code is employed in reality.

At this time, the bitstream fragment 20 breaks off in the middle of data of the I picture, and from the head of the bitstream fragment 21, the I picture header 23 and the I picture are arranged in this order. Although the bitstream fragment 20 breaks off in the middle of data of the I picture, the same principle is applied to a case where the bitstream fragment 20 breaks off in the middle of data of the B picture or P picture.

In FIGS. 10(a) to 10(e), the I picture header 23 is arranged immediately after the bitstream fragment 20. However, the same explanation is applied to a case where the picture header is arranged in the middle of the bitstream fragment.

After the bitstream fragment 20 is decoded as far as the code immediately before the code at the end, the code at the end is decoded. Initially, there is considered a case in which no dummy data is added. As shown in FIG. 10(e), when the code 22a at the end is "011", the code comprising "011" is not independently present on the code table shown in FIG. 10(f). However, the code 22a is combined with the code "0" at the head of the picture header 23 to form "0110", thereby decoding the code "0110" as a symbol "E". As a result, since the head of the picture header 23 is missing, the picture header 23 is not recognized as a normal picture header in the following decoding processing. Further, when a code comprising the rest of the picture header 23 and the head of the following I picture agrees with the code on the code table, this code is decoded, failing to perform normal decoding of the I picture.

Meanwhile, as shown in FIG. 10(a), when the code 22a at the end is "011" and the code comprising "011" is not independently present on the code table shown in FIG. 10(f), the code 22a is combined with the code "0" at the head of the dummy data 10a to form "0110", thereby decoding the code "0110" as a symbol "E". However, since the head of the rest of the dummy data 10a comprises a code "0000" which is not present on the code table, the code "0000" is considered an error code in the conventional decoding processing.

In addition, as shown in FIG. 10(b), when the code 22b at the end of the bitstream fragment 20 is "01", the code comprising "01" is not independently present on the code table. Even when the code 22b is combined with the code "00" at the head of the dummy data 10a to form "0100", the code "0100" is not present on the code table to be considered an error code in the conventional decoding processing.

Further, as shown in FIG. 10(c), when the code 22c at the end of the bitstream fragment 20 is "0111", the code comprising "0111" is independently decoded as a symbol "P". However, since the head of the following dummy data 10a comprises a code "0000" which is not present on the code table, the code "0000" is considered an error code in the conventional decoding processing.

Furthermore, as shown in FIG. 10(d), when the code 22d at the end of the bitstream fragment 20 is "0", the code comprising "0" is not independently present on the code table. Even when the code 22d is combined with the code "000" at the head of the dummy data 10a to form "0000", the code "0000" is not present on the code table. Therefore, the code comprising the code 22d at the end and the head of the dummy data 10a is considered an error code in the conventional decoding processing.

The I picture header starts at a code "0000 0000 0000 0000 0000 0001", called a start code in which "0" of 0 bit or more, which are called stuffing bits, can be arranged before. Accordingly, after considering the code as an error code in each case described above, the start code that agrees with this condition is searched, thereby reliably catching the following I picture header.

Consequently, by arranging a bitstream as dummy data, which bitstream is such that the bitstream itself is not present on a code table and that, even when the head of the bitstream is combined with another bitstream immediately before the bitstream, one of the code obtained by combining the head of the bitstream with another bitstream and the code of the rest of the bitstream is not present on the code table, one of the codes including the dummy data can be detected as an error code.

Thereby, the decoding is once stopped at a position at which the dummy data is arranged, i.e., a position immediately before the picture header, and the decoding is performed again from the I picture header, thereby performing normal decoding processing without lack.

When a conventional decoding apparatus finds an error code that is not present on a code table, decoding of a picture that has been decoded till this time is stopped immediately, and error concealment processing is performed to the picture. As an example of error concealment processing, concerning a picture that has not been decoded by stopping, a content of the previous picture that has been decoded is copied to a portion of the picture that is not accomplished, thereby accomplishing a video frame, and the video frame is displayed in place of the picture that has not been decoded by stopping. Then, processing of skipping to a header of a next picture is performed. Alternatively, as another example of error concealment processing, a picture that has not been decoded by stopping is not displayed at all, and processing of skipping to a header of a next picture is only performed. In addition, one of these error concealment processings may be always performed, and the processing may be adaptably switched.

As a result, by arranging this dummy data, error code detection is securely performed at a position at which the dummy data is arranged. Consequently, even when abnormal decoding is performed in the vicinity of a connection part between bitstream fragments, an elementary bitstream is not parsed as far as a bitstream after the connection part, at which a syntactic error clearly occurs, whereby a decoding apparatus does not take wasteful time, and time required for the following normal decoding operation can be reserved In addition, especially in the MPEG standard, like the patterns shown in FIGS. 10(a) to 10(d), it is possible to set the picture header at the head of the bitstream fragment. For this, the dummy data is inserted to the connection part between the bitstream fragments at which an error is probable to occur to generate an error therein. Consequently, especially in the MPEG standard, since a decoding apparatus reliably finds discontinuous positions at connection parts between bitstream fragments, excessive disturbance of pictures can be prevented from occurring, without decoding pictures different from the original pictures.

Further, in this case, error detection is securely performed at the connection part, and the elementary bitstream is not parsed as far as a bitstream after the connection part, at which a syntactic error clearly occurs. Therefore, a decoding apparatus does not take wasteful time, and time required for the following normal decoding operation can be reserved.

Figure 11:
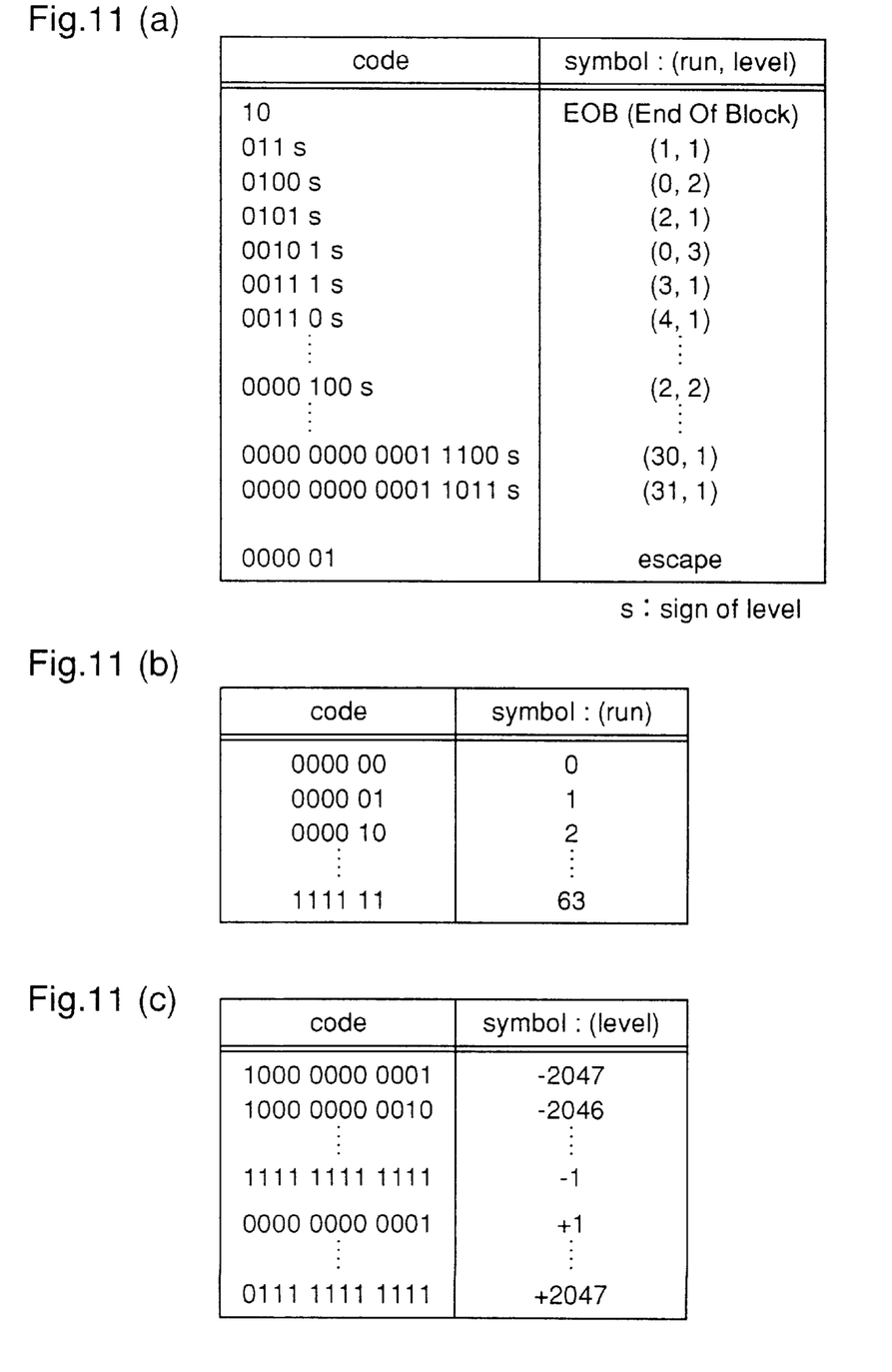
FIGS. 11(a) to 11(c) are diagrams illustrating code tables for explaining the decoding method according to the embodiment of the invention.

Next, a description is given of dummy data that is used when MPEG 2, which is the standard higher than the MPEG, is utilized as a coding method. FIGS. 11(a) to 11(c) are diagrams illustrating code tables of variable length codes for representing DCT coefficient information used for the MPEG2 standard. This DCT coefficient information is obtained by representing the number of consecutive "0" and the size of a coefficient of not "0" that appears after that, when coefficients of a block are scanned zigzag, as "run" and "level", respectively.

The combinations of "run" and "level" appearing more frequently are specified by the code table shown in FIG. 11(a), and the combinations of "run" and "level" appearing less frequently are specified by the code tables shown in FIGS. 11(b) and 11(c), sequentially to an escape code. In FIG. 11(a), "s" at the end of each code represents a sign of "level", and the level sign of "0" is positive and the level sign of "1" is negative. That is, (run, level)=(0, −3) corresponds to a code "0010 11", and (run, level)=(2, −2046) corresponds to a code "0000 01 0000 10 1000 0000 0010".

Therefore, in the DCT coefficient information, the largest code length of "0" data is 17 bits of "0000 01 0000 00 0000 0000 0001" corresponding to (run, level)=(0, 1), and "0" data longer than this code do not appear. More specifically, concerning the DCT coefficient information, a code comprising consecutive "0" data of 18 bits or more is an error code, and the code becomes an error code even when the code is lost in another code corresponding to a symbol of DCT coefficients. Since consecutive "0" data of 18 bits or more are not present in the code tables, the code itself becomes an error code.

In the MPEG standard, a start code comprising "0" data of 23 bits and "1" data of 1 bit is arranged at the head of the picture header. Therefore, as described for the state shown in FIG. 10(a), for example, when data at the end of the bitstream fragment and "0" data of 17 bits at the head of the dummy data are recognized as a code, if the dummy data comprises "0" data of 18 bits, "0" of 24 bits are present between "0" data of 1 bit of the rest of the dummy data and the start code in the picture header. Since such a code comprising consecutive "0" data of 24 bits is not present on the code table, this part is considered an error code, thereby resuming decoding processing from the start code of the picture header immediately after the dummy data.

Consequently, by arranging dummy data comprising consecutive "0" data of 18 bits or more immediately before a header of a specified picture layer, error code detection can be securely performed when a bitstream fragment immediately before the dummy data is cut at DCT coefficient information.

It is supposed that the bitstream fragment comprises the DCT coefficient information. In reality, in the MPEG2 standard, consecutive "0" data of 22 bits at the most may be present in a region called an extension. Therefore, by inserting "0" data of 23 bits or more, for example, "0" data of 32 bits, as dummy data during decoding, data including the dummy data can be securely detected as an error code in the decoding apparatus.

In addition, in the MPEG standard, variable length codes are generally used for information of a macroblock layer and a lower layer, such as DCT coefficient information, and it is forbidden to use consecutive "0" data of 23 bits or more, for a code except a start code. Accordingly, when "0" data of 23 bits or more are used as dummy data, the decoding apparatus can find the dummy data itself as a symbol that is not defined to detect the code as an error code.

Figure 3:
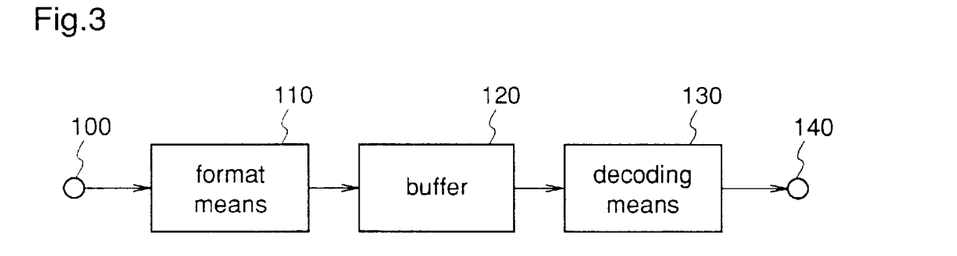
FIG. 3 is a block diagram illustrating a decoding apparatus according to the embodiment of the invention.

FIG. 3 is a block diagram illustrating a decoding apparatus that is used in the decoding method according to the embodiment of the invention. In the figure, an input terminal 100 to which bitstreams are input is connected to format means 110. A buffer 120 is connected to an output of the format means 110, decoding means 130 is connected to an output of the buffer 120, and an output terminal 140 is connected to an output of the decoding means 130.

A description is given of the operation of the decoding apparatus. Initially, digital moving pictures are input as bitstream fragments comprising packets, to the input terminal 100. The input bitstream fragments are input to the format means 110 to perform format processing.

Figure 4:
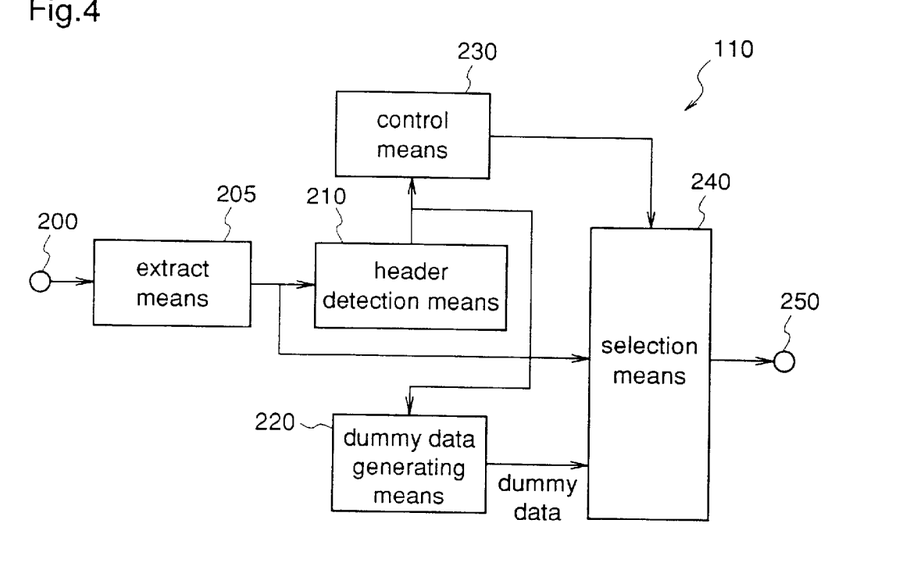
FIG. 4 is a block diagram illustrating format means of the decoding apparatus according to the embodiment of the invention.

FIG. 4 shows the format means 110. In the figure, the format means 110 comprises an input terminal 200, extract means 205, header detection means 210, dummy data generating means 220, control means 230, selection means 240, and an output terminal 250.

In the format means 110, the bitstream fragments comprising the packets are input to the input terminal 200, and further input to the extract means 205. The extract means 205 extracts only the payload regions of the packets, and outputs the same to the header detection means 210 and the selection means 240. The header detection means 210 receives the output from the extract means 205, and detects positions of headers of specified pictures, for example, I pictures, from this output. Then, the header detection means transmits the header positions to the control means 230, and instructs the dummy data generating means 220 to generate dummy data and output the same to the selection means 240.

At this time, the header detection means 210 does not parse picture data, and only performs simple detection operation of the I picture headers.

The control means 230 receives the output from the header detection means 210, and controls the selection means 240 so that the dummy data are inserted immediately before the headers of the I pictures and the output of the extract means 205 and the output of the dummy data generating means 220 are selected. Then, the selection means 240 outputs the selected outputs of the extract means 205 and the dummy data generating means 220 to the output terminal 250.

The output of the format means 110 is once buffered in the buffer 120, and is input to the decoding means 130. The decoding means 130 decodes the digital moving pictures to output the same to the output terminal 140.

Figure 12:
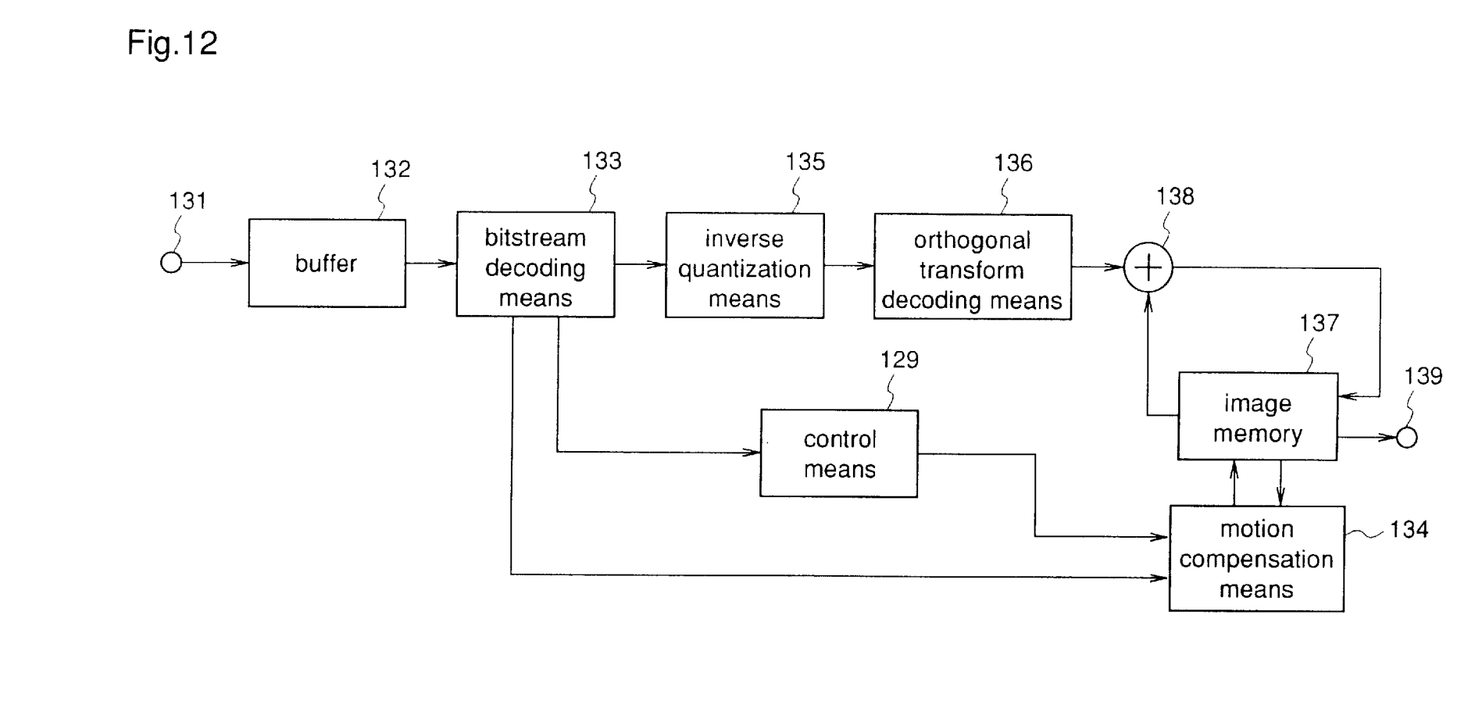
FIG. 12 is a block diagram for explaining decoding means of the decoding apparatus according to the embodiment of the invention.

As the decoding means 130, general decoding means using a code table is used. FIG. 12 shows an example of the decoding means 130. In this case, decoding means that is usually used for the MPEG is described. The bitstreams that are input to an input terminal 131 are once buffered in a buffer 132, and are input to a bitstream decoding means 133. The bitstream decoding means 133 decodes and outputs motion vectors and picture information, such as DCT coefficients. At fast forward play and fast reverse play, the bitstream decoding means 133 selectively decodes only I picture data. This decoding is performed by converting the bitstreams into symbols corresponding to the bitstreams, for example, picture data, using a code table. The bitstream decoding means performs detection of error codes that are produced by arranging the dummy data. The decoded motion vectors are transmitted to motion compensation means 134. The decoded picture information is transmitted to inverse quantization means 135.

The inverse quantization means 135 inverse-quantizes the picture information, and orthogonal transform decoding means 136 performs orthogonal transform decoding of such as inverse DCT. The resulting decoded data and picture data in an image memory 137 storing decoded picture data are added in an adder 138 and stored in the image memory 137. At this time, the decoded picture data are obtained by performing motion compensation to decoded data that have been stored in the image memory 137, using the motion vectors by the motion compensation means 134.

The added picture data are read out of the image memory 137 in the order of outputting decoded pictures to be output to an output terminal 139.

In the decoding means 130, when the bitstream decoding means 133 finds a symbol that is not originally defined, decoding of a picture with the symbol is stopped immediately, and the picture is skipped to a header of a next picture. Simultaneously with this processing, error concealment processing is performed to the picture. The bitstream decoding means 133 outputs error information to control means 129. The control means 129 receives this error information, and outputs an error concealment instruction signal to the motion compensation means 134. The motion compensation means 134 performs error concealment processing to the picture.

As error concealment processing, concerning the picture that has not been decoded by stopping, the motion compensation means 134 copies a content of the previous picture that has been decoded from the image memory 137, to a portion of the picture that is not accomplished, thereby accomplishing a video frame, and the video frame is stored in the image memory 137 in place of the picture that has not been decoded by stopping. Alternatively, as another error concealment processing, the picture that has not been decoded by stopping is not stored at all in the image memory 137, and the picture portion that has been stored is nullified to release the image memory. In addition, one of these error concealment processings may be always performed, and the processing may be adaptably switched.

In this way, the error concealment processing and the processing of skipping to the next picture header are performed to the input data. Similarly, when the presence of the header and extension does not satisfy a specified syntactic rule, the same processing as described above is performed. Therefore, the error code that is produced by adding the dummy data as in the embodiment of the invention can detected by the conventional decoding means.

As described above, according to the embodiment of the present invention, the dummy data 10 are inserted immediately before the picture headers of the I pictures, each of which dummy data is such that one of codes including portions of a bitstream of the dummy data does not correspond to a specified code table that is used for decoding bitstreams. Thereby, error codes are produced immediately before the picture headers, and decoding is reliably resumed at each I picture in the decoding means 130. Consequently, even when codes at the vicinity of the connection parts between the bitstream fragments are recognized as codes different from the original codes to be decoded, excessive disturbance of pictures can be prevented from occurring, without decoding I pictures different from the original pictures.

Further, in this case, error detection is securely performed immediately before the I picture header, and the elementary bitstream is not parsed as far as a bitstream after the connection part, at which a syntactic error clearly occurs. Therefore, the decoding means 130 does not take wasteful time, and time required for the following normal decoding operation can be reserved.

Figure 13:
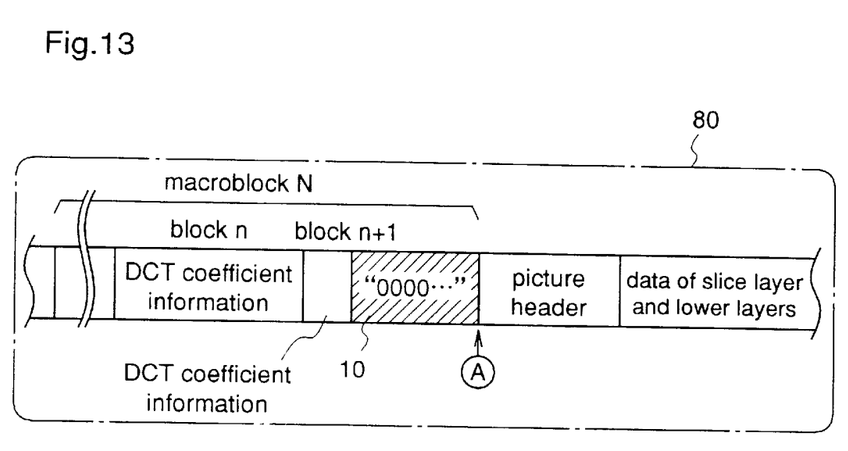
FIG. 13 is a diagram for explaining a modification of the decoding method according to the embodiment of the invention.

A description is given of a modification of the embodiment of the invention, with reference to FIG. 13. In the figure, the same reference numerals as those shown in FIG. 2 designate the same or corresponding parts. In the embodiment described above, after extracting only the data required for decoding that are stored in the payload regions of the packets constituting the bitstream fragments, the dummy data are inserted immediately before the picture headers. Meanwhile, in this modification, as shown in FIG. 13, data immediately before the picture layers are replaced with the dummy data 10.

A decoding method according to the modification is performed using a decoding apparatus with the format means 110 shown in FIG. 4, in which the control means 230 controls the selection means 240 so that data immediately before the pictures are replaced with the dummy data.

As in the modification, errors are produced by replacing the data immediately before the pictures with the dummy data, and decoding is reliably resumed from the pictures next to the dummy data in the decoding apparatus. Therefore, without decoding pictures different from the original pictures, excessive disturbance of the pictures can be prevented from occurring.

Since the data immediately before the picture headers are replaced with the dummy data, the bit number of the elementary bitstream is not increased by the dummy data, thereby reducing a burden on data transmission, as compared with the embodiment of the invention.

In the embodiment of the invention, decoding is performed using the decoding apparatus shown in FIG. 3. In the present invention, however, decoding can be performed using such as a computer that is programmed to have the same means as in the decoding apparatus, with the same effects as in the embodiment of the invention.

In the embodiment of the invention, the dummy data comprising consecutive "0" data is used. In the present invention, however, dummy data comprising another bitstream, for example, consecutive "1" data, can be employed with the same effects as in the embodiment of the invention, as long as the bitstream satisfies the condition that at least one of codes including portions or all of the bitstream does not correspond to a code table that is used for decoding.

In addition, there is described one of advantages of using the consecutive "0" data as the dummy data. When a continuous normal bitstream is input at normal play, "0" data are inserted before a start code of a picture header. Usually, when several "0" data are arranged immediately before the start code of the header, these "0" data are considered stuffing data, i.e., a part of the start code. Therefore, the dummy data comprising "0" data is considered stuffing data to be skipped, so that the dummy data is not recognized as an error code during decoding the bitstream, and error processing is not performed at the normal play, resulting in a reduction in burden of error processing.

In the embodiment of the invention, in fast forward play and fast reverse play, the bitstream fragments at intervals are input to the decoding apparatus. However, the present invention may be applied to a case where continuous bitstream fragments are input.

In the embodiment of the invention, in fast forward play and fast reverse play, only the I pictures are decoded and displayed as specified bitstreams. However, the present invention may be applied to a case of decoding and displaying the I pictures and P pictures and a case of decoding and displaying all types of the pictures. For example, when all the pictures are decoded and displayed, the dummy data are inserted immediately before the picture headers of all the pictures, or data immediately before the picture headers of all the pictures are replaced with the dummy data, thereby obtaining the same effects as in the embodiment of the invention.

In the embodiment of the invention, insertion and replacement of the dummy data are carried out immediately before the picture headers of the I pictures of the hierarchy constituted by the pictures in the bitstream. In the present invention, however, the dummy data may be arranged before hierarchical information, such as headers and extensions, of specified bitstreams among bitstreams constituting a specified hierarchy in the bitstream. Especially, the dummy data can be arranged before all the picture headers with the same effects as in the embodiment of the invention, although the header detection means 210 detects positions of all the picture headers.

The decoding method and the decoding apparatus according to the embodiment of the invention may be applied to a decoding method in which MPEG2, the standard higher than the MPEG, "Information Technology—Generic coding of moving pictures and associated audio for digital information" (ISO/IEC13818-2) is used as a coding method, and a decoding method in which the standard, called H.261, "Video Codec for Audiovisual services at p×64 kb/s" (CCITT Recommendation H.261) is used as a coding method.

In the embodiment of the invention, the digital moving pictures are decoded and displayed. However, the present invention can be applied to decoding and reproduction of digital audio using a code table, and decoding of data signals with another variable length codes with the same effects as in the embodiment of the invention.

What is claimed is:

1. A decoding method including using a plurality of first bitstreams partially obtained by dividing a main bitstream with a hierarchical structure as inputs at a preprocessing unit for selectively obtaining previously stored bitstreams, said first bitstreams being successively and discontinuously input with predetermined spaces therebetween, successively arranging the first bitstreams and generating and inserting or overwriting selected second bitstreams immediately before a start position of first hierarchical information which is obtained by detection, among bitstreams constituting a specified hierarchy in the first bitstreams, each second bitstream comprising at least one of a plurality of codes including portions of the second bitstream that do not correspond to specified code tables that are used for decoding bitstreams, thereby forming a third bitstream.

2. The decoding method of claim 1 including, after forming the third bitstream, decoding the third bitstream using the specified code tables, while recognizing a code including a portion of the second bitstream that does not correspond to the specified code tables as an error code.

3. The decoding method of claim 1 including stopping the decoding processing when a code including a portion of the second bitstream is recognized as an error code, and resuming decoding processing from the first hierarchical information after the second bitstream having the portion in the code recognized as an error code.

4. The decoding method of claim 1 including performing specified error processing to the bitstream that has been decoded immediately before a code recognized as an error code.

5. The decoding method of claim 1 wherein:
the first hierarchical information comprises header information; and
said first bitstreams comprises bitstreams including the specified picture information among bitstreams that are obtained by dividing the main bitstream including the plurality of specified picture information that are arranged along a time series.

6. The decoding method of claim 5 wherein the specified picture information is one of I picture information, I and P picture information, and I, P and B picture information.

7. The decoding method of claim 1 wherein the second bitstream is inserted between the first hierarchical information and the information immediately before the first hierarchical information.

8. The decoding method of claim 1 wherein the second bitstream is replaced with a bitstream immediately before the first hierarchical information.

9. The decoding method of claim 1 wherein the second bitstream comprises consecutive "0" data of at least 23 bits.

10. A decoding apparatus using a plurality of bitstreams respectively including first bitstreams that are partially obtained by dividing a main bitstream with a hierarchical structure as inputs at a preprocessing unit for selectively obtaining previously stored bitstreams, said first bitstreams being successively and discontinuously input with predetermined spaces therebetween, comprising:
extract means for extracting the first bitstreams from the plurality of bitstreams and outputting the same;
detection means for detecting start positions of hierarchical information of specified bitstreams from bitstreams constituting a specified hierarchy that are included in the output of the extract means;
second bitstream generating means for generating second bitstreams, each being such that at least one of a plurality of codes including portions of the second bitstream does not correspond to a plurality of specified code tables that are used for decoding bitstreams;
selection means for selecting and outputting the output of the extract means and the output of the second bitstream generating means; and
control means for controlling the selection means so that the second bitstreams are inserted or overwritten immediately before the start positions of the hierarchical information that are detected in the detection means.

11. The decoding apparatus of claim 10 wherein the second bitstream comprises consecutive "0" data of 23 bits and over.

* * * * *